Sept. 8, 1925.
A. O. H. LEIPF
1,553,179
MEAT HANDLING DEVICE
Filed March 8, 1923
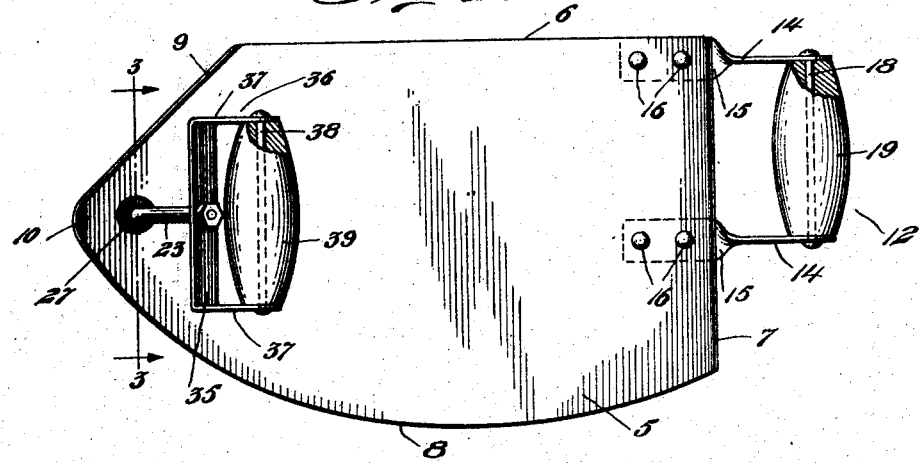
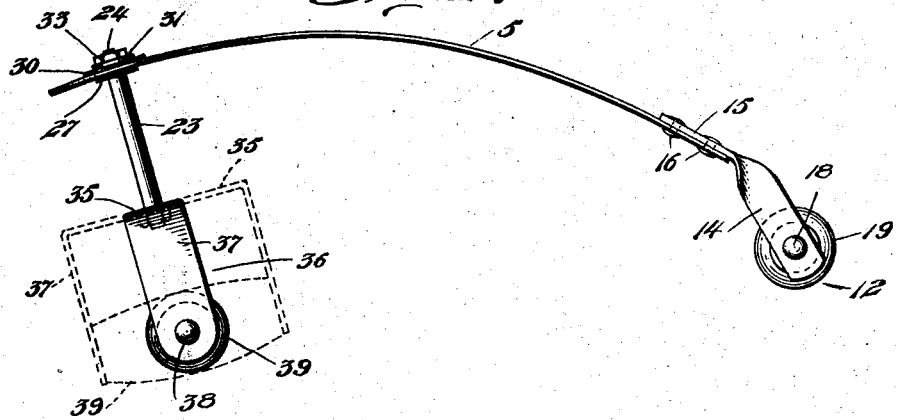
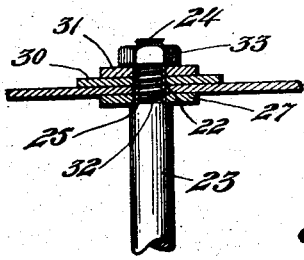
Inventor
Adam O. H. Leipf
By Horatio E. Bellows
Attorney Patented Sept. 8, 1925.

1,553,179

UNITED STATES PATENT OFFICE.

ADAM O. H. LEIPF, OF PROVIDENCE, RHODE ISLAND.

MEAT-HANDLING DEVICE.

Application filed March 8, 1923. Serial No. 623,661.

*To all whom it may concern:*

Be it known that I, ADAM O. H. LEIPF, a citizen of the United States, residing at Providence, in the county of Providence and State of Rhode Island, have invented certain new and useful Improvements in Meat-Handling Devices, of which the following is a specification.

My invention relates to a device for manipulating meat without contact of the operator's hands with the latter. It is particularly advantageous in conveying chopped or macerated meat. One use is for handling the meat in the rotary tray of an ordinary meat chopping machine wherein portions of the mass of chopped meat being operated upon are required to be changed from place to place in the tray as the meat is being repeatedly subjected to the action of the knives. Another use is the conveyance of meat from tubs or carriers of rectangular or other cross section to and from the chopping machine. It will be understood that the described uses of the device are not exclusive.

The essential objects of my invention are to afford a handling means which fulfills the requirements of boards of health that the meat shall at no time come in contact with the operator's hands; to enable the facile conveyance of the meat in any desired direction and without wrenching or twisting the arms and body in such operation; to accommodate the device for use in the tray of a chopping machine and without danger of interference with the knife guard above the tray; to afford accesibility of the device to corners and concavities of all kinds; and to attain these ends in an inexpensive structure.

To the above ends essentially my invention consists in such parts and in such combinations of parts as fall within the scope of the appended claims.

In the accompanying drawings which form a part of this specification,

Figures 1 and 2 are a front elevation and a plan view respectively of my novel device, and Figure 3, a fragmentary section of the same on line 3—3 of Figure 1.

Like reference characters indicate like parts throughout the views.

In the form of my invention herein shown 5 is a longitudinally arcuate body portion composed of a thin flexible sheet of steel, having a straight upper edge 6, an end edge 7 at right angles to the top edge, a convex lower edge 8, and a diagonal or inclined edge 9 extending downwardly and outwardly from the edge 6 and converging with the edge 8 to form a rounded point 10, at the end of the body opposite the end bounded by the edge 7.

Fast to the upper portion of one end of the body is a handle 12 consisting of flat arms 14 having integral attaching portions 15 upon their inner ends resting against the back of the body and fixed thereto by rivets 16. A pin 18 connecting the arms 14 is fast to the latter near their ends, and has rotatably mounted thereon a hand roller 19.

In the pointed end portion 10 of the body is a hole 22. Pivotally mounted in this hole is a rod 23 having a reduced end portion 24 forming an annular shoulder 25, and extending loosely through the hole 22. Between the shoulder and body is interposed a washer 27. Upon the portion 24 upon the rear face of the body are one or more washers 30 and 31. This portion has also a thread 32 to receive a nut 33 engaging the washer 31. The forward end of the rod 23 is fast to the middle of the cross piece 35 of a yoke 36 whose arms 37 have near their ends a pin 38 on which is a roller 39. The yoke and roller constitute a handle that is capable of assuming any convenient axial position in a plane parallel with the plane of the body by virtue of the pivotal mounting of the rod 23 in the body. The rod may, however, be fast in the body and loose in the cross piece 35.

In operation the operator's right and left hands grasp the rollers 19 and 39 respectively and bring the edge 8 of the body 5 downwardly into the mass of the meat preferably at a slight incline towards himself, and then tilt the body 5 to a substantially horizontal plane with a mass of the meat on the concave upper face of the body, in which position the meat may be conveyed without contact of his hands with the meat. By virtue of the convex edge 8 and the inclined edge 9 the body 5 is accommodated to the usual trough of a chopping machine, and the point 10 increases accessibility to the corners of any receptacle. The manipulative motions are performed without torsional strain upon the operator's arms and body by the pivotal capacity of the left hand handle. In Figure 2 the broken lines indicate the latter in an optional angular position.

I claim:—

1. A meat handling device composed of a thin, flexible sheet metal plate forming an oblong longitudinally cupped body, a handle attached to the inner face of one end of said cupped body, and a handle attached to the other end of said body, said handles being independent of and disconnected from each other, said body being capable of being further cupped in use.

2. In a meat handling device, a sheet metal plate forming a resilient longitudinally cupped body, a laterally projecting handle secured to one end of the body, and a second handle pivotally supported upon the face of the body near its other end, said handles being independent of and disconnected from each other.

3. In a meat handling device, a flexible plate forming a longitudinally cupped body, a lateral handle fast to one end of the body, a post pivotally mounted in the body near its other end, and a handle fast to the post, said handles being independent of and disconnected from each other.

4. In a meat handling device, a flexible plate forming a longitudinally cupped body comprising a broad end portion and an opposite pointed end portion, arms fast to the end portion, a hand roller supported in the arms, a post in the margin of the pointed end portion disposed at an angle to the plane of the body, a yoke on the post, and a hand roller supported by the yoke, said device being adapted to be used with the body disposed vertically and the ends drawn toward each other.

5. In a meat handling device, a flexible plate comprising a member having an oblong concave convex body comprising a straight upper edge, a straight end edge, and an inclined edge extending from the top edge to the bottom edge, a laterally projecting handle fast to the body at its end edge, a post mounted in the body near the junction of the inclined edge with the curved edge, and disposed at substantially right angles to the plane of the body, and a handle upon the end of the post disposed at right angles thereto, said handles being independent of and disconnected from each other.

6. A meat handling device composed of a longitudinally arcuate body of flexible material having a convex lower edge, a handle attached at one end and extended substantially in alignment with the length of said body, and a handle near the other end and disposed substantially at right angles to the vertical side face of said body, said handles being independent of and disconnected from each other.

In testimony whereof I have affixed my signature.

ADAM O. H. LEIPF.